(12) United States Patent
Wakita (10) Patent No.: US 9,024,491 B2
(45) Date of Patent: May 5, 2015

(54) ELECTROMECHANICAL ACTUATOR

(75) Inventor: Masaya Wakita, Tokyo (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 101 days.

(21) Appl. No.: 13/586,434

(22) Filed: Aug. 15, 2012

(65) Prior Publication Data

US 2014/0049140 A1  Feb. 20, 2014

(51) Int. Cl.
| | |
|---|---|
| *H02K 7/06* | (2006.01) |
| *H02K 7/00* | (2006.01) |
| *H02K 16/00* | (2006.01) |
| *B64C 13/28* | (2006.01) |

(52) U.S. Cl.
CPC .. *H02K 7/00* (2013.01); *H02K 7/06* (2013.01); *H02K 16/00* (2013.01); *B64C 13/28* (2013.01); *Y02T 50/44* (2013.01)

(58) Field of Classification Search
USPC .................................................. 310/80, 75 R
See application file for complete search history.

(56) References Cited

U.S. PATENT DOCUMENTS

| | | | | |
|---|---|---|---|---|
| 3,202,009 | A * | 8/1965 | Geyer ........................... | 74/89.28 |
| 4,494,025 | A * | 1/1985 | Fickler ............................ | 310/80 |
| 4,637,272 | A * | 1/1987 | Teske et al. ................... | 74/89.26 |
| 5,214,972 | A |  6/1993 | Larson et al. | |
| 8,136,418 | B2 |  3/2012 | Behar et al. | |
| 8,230,750 | B2 |  7/2012 | Flatt et al. | |

FOREIGN PATENT DOCUMENTS

| | | |
|---|---|---|
| FR | 2 843 181 A1 | 2/2004 |
| JP | S48-76300 | 10/1973 |
| JP | 2007-144581 | 6/2007 |
| JP | 2008-008470 A | 1/2008 |
| WO | WO 91/05698 A1 | 5/1991 |
| WO | 2007/024220 | 3/2007 |
| WO | WO 2007/099333 A1 | 9/2007 |

OTHER PUBLICATIONS

Extended European Search Report dated Jul. 3, 2012, in European Patent Application No. 12 161 004.2.
Office Action issued Oct. 28, 2014 to Japanese Patent Application No. 2011-075936.

* cited by examiner

*Primary Examiner* — Dang Le
(74) *Attorney, Agent, or Firm* — Oblon, McClelland, Maier & Neustadt, L.L.P.

(57) ABSTRACT

An electromechanical actuator includes a first system and a second system. The first system includes a first motor and a first movable element capable of being moved back and forth in an axial direction of a rod. The second system includes a second motor and a second movable element capable of being moved back and forth in the axial direction of the rod. The electromechanical actuator is capable of adjusting a stroke length which is a distance between the first driving section set to or in the proximity of an end portion of the first movable element and the second driving section set to or in the proximity of an end portion of the second movable element. The first movable element and second movable element are configured for back and forth movement in the axial direction of the common rod.

4 Claims, 6 Drawing Sheets

ELECTROMECHANICAL ACTUATOR

CROSS REFERENCES TO RELATED APPLICATIONS

The present disclosure contains subject matter related to that disclosed in Japanese Priority Patent Application JP 2011-075936 filed in the Japan Patent Office on Mar. 30, 2011, the entire content of which is hereby incorporated by reference.

BACKGROUND OF THE INVENTION

1. Field of the Invention

This invention relates to an electromechanical actuator.

2. Description of the Related Art

Conventionally, a hydraulically driven actuator is used frequently as an actuator for use with a driving system for aircrafts, general industrial machinery and so forth. On the other hand, in the field of the aircraft technology, an electromechanical actuator (EMA) which can achieve reduction in weight in comparison with a hydraulically driven actuator and eliminates oil maintenance is and has been researched and developed, and it is being attempted to place an electromechanical actuator into practical use.

As an example of an electromechanical actuator, an electromechanical actuator can be listed which is configured such that a rod, that is, a threaded shaft member, is screwed in a rotatable member in the form of a nut which is rotated by a motor and, based on a feed amount of the rod per one rotation of the motor, the rod is moved in an axial direction in response to the angle of rotation of the motor. In this manner, in the electromechanical actuator configured using the mechanism described above, that is, a ball screw mechanism, in this manner, one end portion of the rod functions as a driving portion.

Another electromechanical actuator is known which adopts a dual mechanism having two driving systems each including a motor and a ball screw from the point of view of failsafe such that a failure such as jamming occurs with one of the systems, the other system is rendered operative so that the operation function of the entire electromechanical actuator can be guaranteed. An electromechanical actuator of the type described is disclosed in Japanese Patent Application Laid-Open No. 2008-8470 (hereinafter referred to as Patent Document 1).

In particular, Patent Document 1 discloses an electromechanical actuator which includes a first system which in turn includes a first rotational member rotated by a first motor and a first outputting member which is moved back and forth in an axial direction by driving force outputted from the first motor through the first rotational member, and a second system having a configuration similar to that of the first system.

Figure 5:
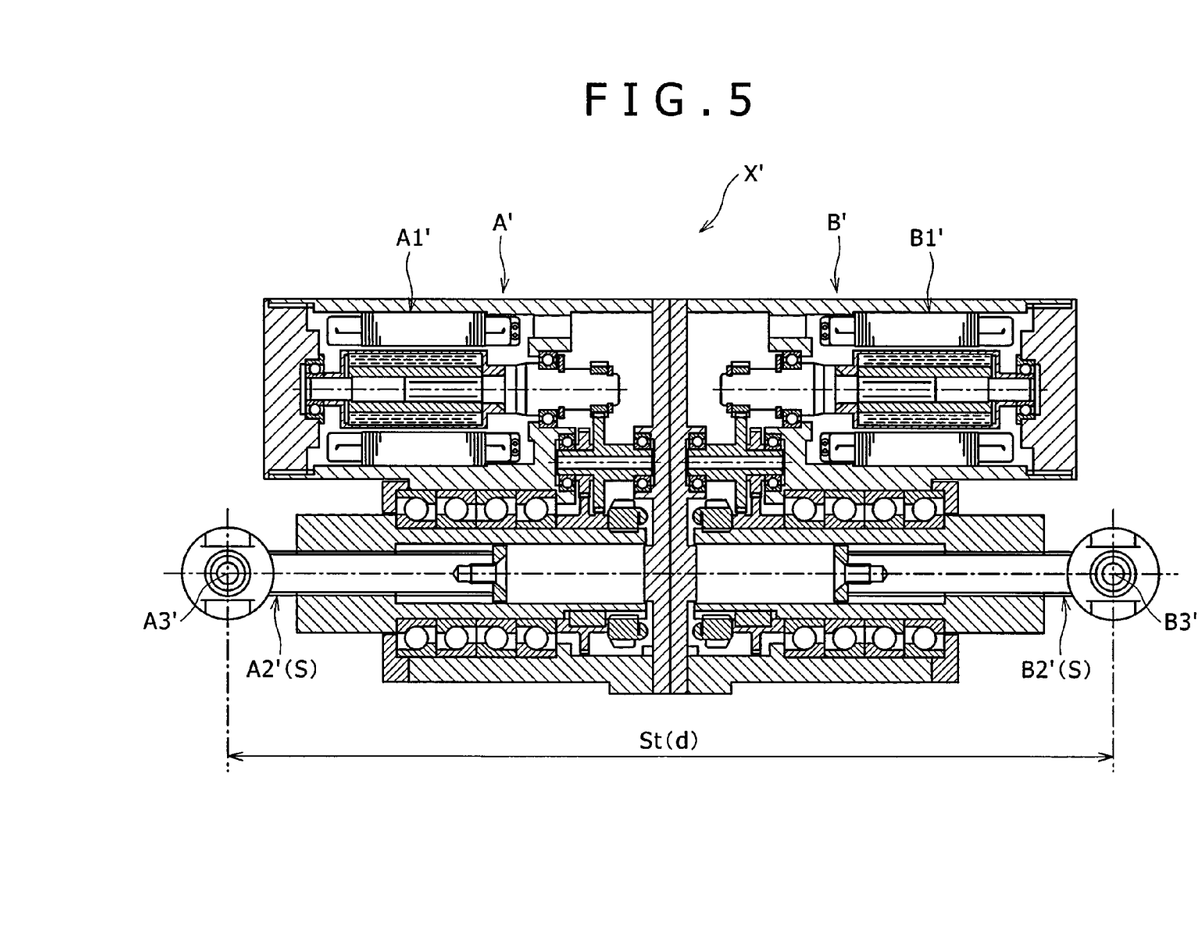
FIG. 5 is a general schematic sectional view of a conventional electromechanical actuator in a minimum stroke state.

FIG. 5 shows an example of such an electromechanical actuator having two systems as described above. Referring to FIG. 5, the electromechanical actuator X' shown is configured such that a first rod A2' which serves as a first outputting member is moved back and forth in an axial direction by rotational driving force of a first motor A1' of a first system A', and a second rod B2' which serves as a second outputting member is moved back and forth in an axial direction by rotational driving force of a second motor B1' of a second system B'. The distance between a first driving section A3' set to an end portion of the first rod A2' and a second driving section B3' set to an end portion of the second rod B2' in FIG. 5 corresponds to a minimum stroke length St(d) of the electromechanical actuator X'. In the state in which the minimum stroke length St(d) is assured, the rods A2' and B2' are positioned nearest to each other. If the positions of the rods A2' and B2' in the state in which the minimum stroke length St(d) is assured are represented as minimum stroke positions (S), then the stroke length St of the electromechanical actuator X' can be increased to a maximum stroke length St(d+α) illustrated in FIG. 6, for example, by driving the second motor B1' from the state described to rotate in a predetermined direction to move the second rod B2' from the first rod A2' with respect to the minimum stroke position (S). It is to be noted that, in FIG. 6, the second driving section B3' in a state in which the second rod B2' is disposed at the minimum stroke position (S) is indicated by an alternate long and two short dashes line.

In this manner, the electromechanical actuator X' is demanded that a minimum stroke length St(d) and a maximum stroke length St(d+α) be set in response to specifications and so forth and a stroke width can be adjusted suitably within a stroke range whose upper and lower limits are provided by the minimum stroke length St(d) and the maximum stroke length St(d+α).

SUMMARY OF THE INVENTION

Figure 6:
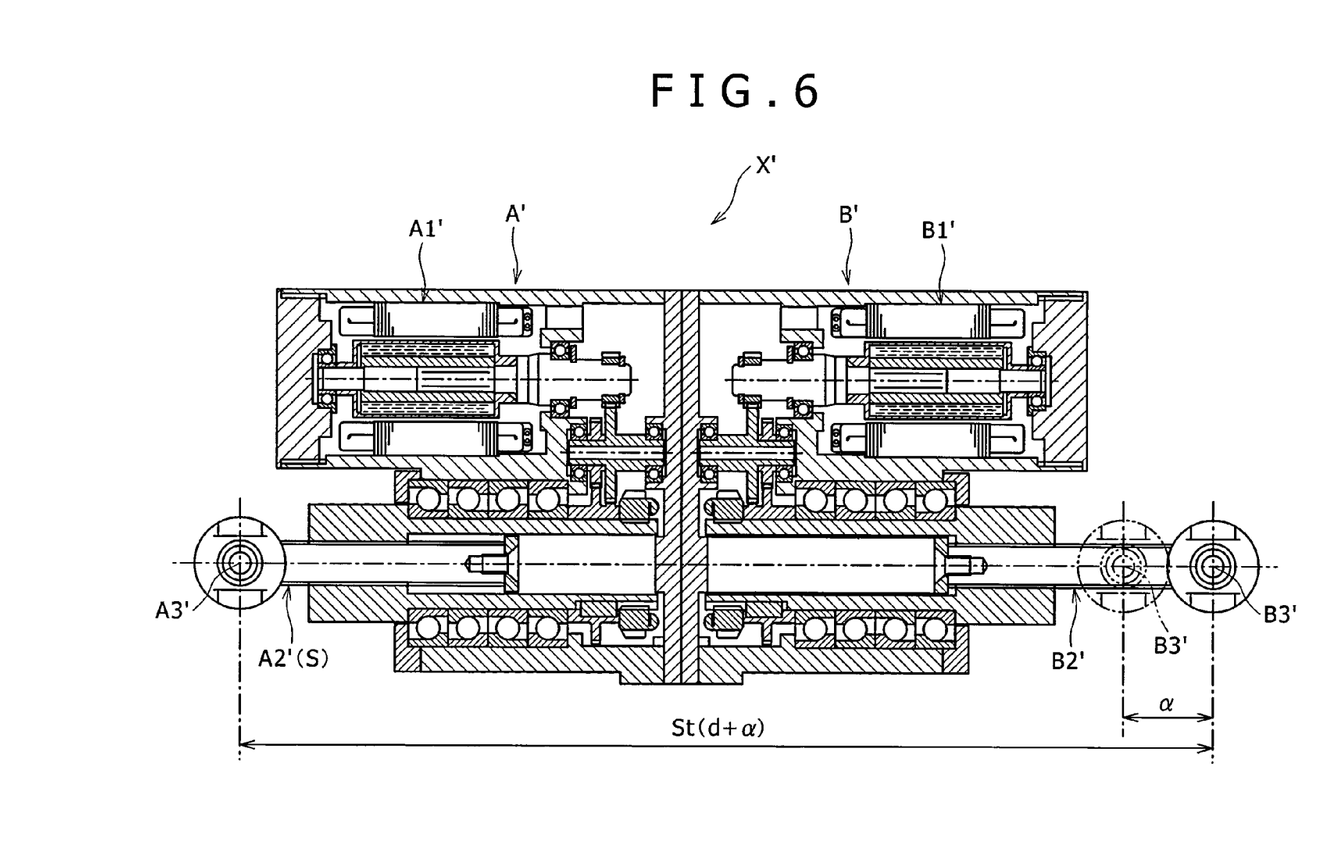
FIG. 6 is a view similar to FIG. 5 showing the conventional electromechanical actuator in a maximum stroke state.

However, in an electromechanical actuator which adopts such a configuration as described above, the following failures are likely to occur. In particular, if the second system B' fails in a state in which the second rod B2' moves in a direction in which the stroke length St increases from the minimum stroke position (S), that is, in a direction in which the second rod B2' moves away from the first rod A2', until the stroke length St of the electromechanical actuator X' becomes greater than the minimum stroke length St(d), as a particular example, in a state in which the maximum stroke length St(d+α) illustrated in FIG. 6 is established, the second rod B2' is disabled from movement and cannot be moved to the minimum stroke position (S). Further, even if the first rod A2' which operates normally is moved in a direction in which it is spaced away from the second rod B2' with respect to the minimum stroke position (S), the minimum stroke length St(d) illustrated in FIG. 5 cannot be assured.

It is an object of the present invention to provide an electromechanical actuator wherein, even if a failure occurs with one of two systems, the other system can be rendered operative to achieve improvement of the failsafe and, upon occurrence of a failure, the system which does not suffer from the failure can be rendered operative to assure a required full stroke width including a minimum stroke length and a maximum stroke length and consequently degradation of the reliability of the overall apparatus can be prevented or suppressed.

In order to attain the object described above, according to the present invention, there is provided an electromechanical actuator including a first system having a first motor and a first movable element capable of being moved back and forth in an axial direction of a rod by rotational driving force of the first motor, and a second system including a second motor and a second movable element capable of being moved back and forth in the axial direction of the rod by rotational driving force of the second motor. The electromechanical actuator may be capable of adjusting a stroke length which is a distance between the first driving section set to or in the end portion or the proximity of an end portion of the first movable element and the second driving section set to or in the end portion or the proximity of an end portion of the second movable element. Here, each of the first driving section and the second driving section may be provided directly at or in the proximity of an end portion of the first movable element or the second movable element or may be attached at or in the proximity of an end portion of the first movable element or the second movable element through some other member.

The electromechanical actuator according to the present invention is configured such that the first movable element and the second movable element are configured for back and forth movement in the axial direction of the common rod such that the stroke length in a state in which the first movable element and the second movable element are positioned at respective reference positions at which the first movable element and the second movable element are positioned nearest to each other is set as a minimum stroke length. The first movable element and the second movable element may be capable of individually moving by at least a difference between a predetermined maximum stroke length and the minimum stroke length in both of directions in which the first movable element and the second movable element move toward and away from each other with respect to the reference positions. Here, in the electromechanical actuator, the state in which the first movable element and the second movable element are positioned at respective reference positions at which the first movable element and the second movable element are positioned nearest to each other includes both of a form in which the movable element contact with each other and another form in which the movable elements do not contact with each other.

In this manner, in the mechanical actuator according to the present invention, the first movable element and the second movable element are disposed on the same rod and are set for back and forth movement in the axial direction of the rod. Then, in a state in which both of the first system and the second system are normally operating, the stroke length of the electromechanical actuator can be made the minimum value, that is, the minimum stroke length, by setting the first movable element and the second movable element to the respective reference positions. Further, the stroke length of the electromechanical actuator can be made a maximum stroke length required in accordance with specifications or the like by moving at least one of the first movable element and the second movable element by a predetermined distance in a direction in which the first movable element or the second movable element is spaced away from the opposing movable element farther than the corresponding reference position in a state in which both of the first system and the second system are operating normally.

Further, the electromechanical actuator according to the present invention is configured such that the movable elements are movable by a distance equal to or greater than the difference between the predetermined maximum stroke length and the minimum stroke length in both of the advancing and retreating directions, that is, in the forward and reverse directions, along the rod with respect to the respective reference positions. Therefore, for example, even if a failure such as, for example, jamming occurs with one of the systems in a state in which the maximum stroke length is established and the movable element of the system which suffers from the failure at the point of time is placed into a state (case 1) in which movable element is immovable at a position spaced from the movable element of the other system which is operating normally with respect to the reference position, the state in which both movable elements are positioned nearest to each other can be implemented by moving the movable element of the normally operating system toward the movable element of the failed system in the maximum. Then, since the stroke length in the state in which both movable elements are positioned nearest to each other is equal to the stroke length in another state in which both movable elements are positioned at the respective reference positions, even if an event of the case 1 described above occurs, the stroke length of the electromechanical actuator can be made the minimum value, that is, the minimum stroke length. Further, in the event of the case 1, the stroke length of the electromechanical actuator at the point of time at which a failure occurs with one of the systems is the maximum stroke length. From the foregoing, also in the event of the case 1, the required full stroke width including the minimum stroke length and the maximum stroke length can be assured by moving the movable element of the system, which does not suffer from the failure, back and forth in the axial direction of the rod.

Further, in the electromechanical actuator according to the present invention, for example, if another case (case 2) in which a failure occurs with one of the systems in a state in which the minimum stroke length is exhibited is assumed, then both of the movable elements are positioned at the respective reference positions at the point of time of occurrence of this failure. Since one of the movable elements belongs to the system with which the failure occurs, it is placed into an immovable state at the corresponding reference position. When such an event of the case 2 as just described occurs, the electromechanical actuator can obtain the predetermined maximum stroke length if the movable section of the system which is operating normally is moved by a predetermined distance in a direction in which it is spaced away from the movable element which is in the immovable state, that is, from the movable element of the system which suffers from the failure with respect to the reference position thereof. In the case 2 in which the immovable movable element is at the reference position thereof, if the movable element of the normal system is moved by the difference between the maximum stroke length and the minimum stroke length in the direction in which it is spaced away from the immovable movable element with reference to the reference position thereof, then the stroke length of the electromechanical actuator, that is, the distance between the first driving section and the second driving section, becomes the maximum stroke length. Further, in the event of the case 2, the stroke length of the electromechanical actuator at the point of time at which the failure occurs with one of the systems is the minimum stroke length. From the foregoing, also in the event of the case 2, the required full stroke width including the minimum stroke length and the maximum stroke length can be assured by moving the movable element of the system, which does not suffer from the failure, back and forth in the axial direction of the rod.

Also in a case other than the case 1 and the case 2 described above, that is, also in a case in which the stroke length of the electromechanical actuator at the point of time at which a failure occurs with one of the systems is an arbitrary stroke length between the minimum stroke length and the maximum stoke length, the minimum stroke length or the maximum stroke length can be obtained by moving the movable element of the system which does not suffer from the failure toward the movable element side of the system which suffers from the failure with respect to the reference position or by moving the movable element of the system which does not suffer from the failure in the direction in which it is spaced away from the movable element of the system which suffers from the failure with respect to the reference position.

It is to be noted that, if both movable elements are disposed at positions moved by the difference between the maximum stroke length and the minimum stroke length in the directions in which they are spaced away from each other with reference to the respective reference positions, then in this state, the stroke of the electromechanical actuator is greater by the difference between the maximum stroke length and the minimum stroke length than the required maximum stroke length. Accordingly, it is not required in actual use of the electromechanical actuator that the movable elements be moved by the difference between the maximum stroke length and the minimum stroke length in the directions in which they are spaced away from each other from the respective reference positions.

In this manner, since the electromechanical actuator is configured such that each of the movable elements disposed on the common rod can move by at least the difference between the predetermined maximum stroke length and the minimum stroke length in both of the direction in which it approaches the opposing movable element, that is, in the advancing direction, and the direction in which it is spaced away from the opposing movable element, that is, in the retracting direction, with respect to the reference position thereof, even if a failure occurs with one of the systems, the stroke length can be adjusted within the required full stroke width by moving the movable element which belongs to the system which does not suffer from the failure by a suitable amount along the rod axis, consequently the electromechanical actuator that is superior in reliability and practical use can be provided.

Further, while it is possible to apply a movable element which is slidably movable in the axial direction of the rod to the movable elements of the system in the electromechanical actuator, from a point of view of achieving simplification in reliable positioning control or structure, preferably the first movable element is configured using a first rotational member which receives rotational driving force of the first motor to move back and forth with respect to the rod through threaded engagement between the rod and the first rotational member and the second movable element is configured using a second rotational member which receives rotational driving force of the second motor to move back and forth with respect to the rod through threaded engagement between the rod and the second rotational member. By adopting a ball screw mechanism in this manner, rotational movement transmitted from the motor can be converted into movement in an axial direction in a high efficiency.

In order to make it possible to assure, in an electromechanical actuator according to an embodiment of the present invention configured so as to move a movable element in an axial direction of a rod to assure a minimum stroke length, an accurate minimum stroke length both in normal operation and upon occurrence of a failure without giving rise to substantial increase of the number of parts or extreme complication in structure, preferably the first movable element and the second movable element include abutting portions which abut with each other in a state in which the minimum stroke length is exhibited. With such a configuration as just described, movement of each of the movable elements, that is, the first movable element and the second movable element, in a direction in which they further approach each other can be restricted appropriately by causing the abutting portion of the first movable element, that is, the first abutting portion, and the abutting portion of the second movable element, that is, the second abutting portion, with each other. Thus, the stroke length in this state can be kept fixed.

With the electromechanical actuator, since the movable elements of both systems are configured for back and forth movement in the axial direction on the same rod and can be moved by at least the difference between a predetermined maximum stroke length and a minimum stroke length in both of forward and backward directions along the rod with respect to the reference positions, even if one of the systems suffers from a failure, if the movable element of the other system, which operates normally, in the condition described above is moved by a suitable mount toward or away from the movable element of the failed system, then the required full stroke length including the minimum stroke length and the maximum stroke length of the electromechanical actuator can be obtained.

The above and other objects, features and advantages of the present invention will become apparent from the following description and the appended claims, taken in conjunction with the accompanying drawings in which like parts or elements denoted by like reference symbols.

DETAILED DESCRIPTION OF THE PREFERRED EMBODIMENT

In the following, a preferred embodiment of the present invention is described with reference to the accompanying drawings.

Figure 1:
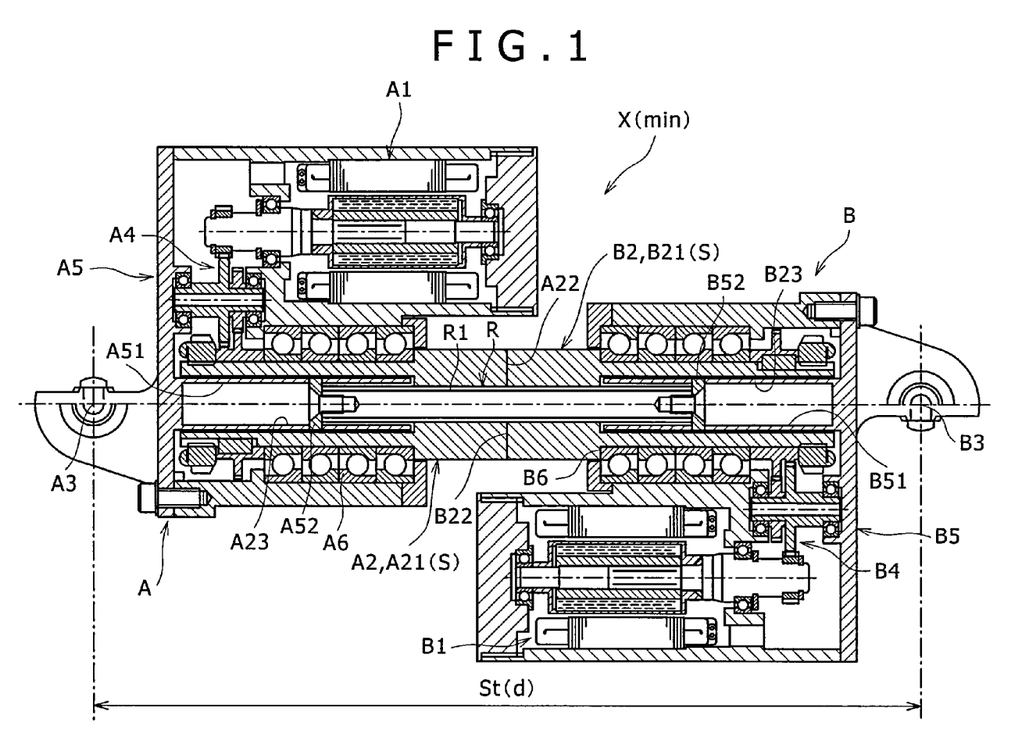
FIG. 1 is a general schematic sectional view of an electromechanical actuator in a minimum stroke state according an embodiment of the present invention.

An electromechanical actuator X according to the present embodiment is used, for example, in order to operate a movable nozzle of a rocket not shown and adopts a redundant design having a first system A and a second system B, as shown in FIG. 1. In the electromechanical actuator of the present embodiment, the first system A is disposed on one end side of a common rod R while the second system B is disposed at the other end side of the rod R such that the stroke length St which is a distance between a first driving potion A3 which is an output end of the first system A and a second driving portion B3 which is an output end of the second system B can be adjusted. The first system A and the second system B have similar configurations to each other, and in the following, description is given principally of the first system A. It is to be noted that, although detailed description of the second system B is omitted because it overlaps with the detailed description of the first system A, in the description given below, elements of the second system B which correspond to elements of the first system A are referred to by like designations which include "second" in place of "first" in designations of the elements in the first system A. Further, in FIG. 1 and so forth, elements of the second system B which correspond to elements of the first system A are referred to by like designations which include "B" in place of "A" in the designations of the first system A.

The first system A includes a first motor A1 which may be a brushless servomotor, and a first movable element A2 which can be moved back and forth in an axial direction of the rod R by rotational driving force of the first motor A1. The first driving potion A3 is disposed in the proximity of an end portion of the first movable element A2 spaced away from the center of the rod R in the axial direction. The first system A further includes a first transmission mechanism A4 for transmitting rotational driving force of the first motor A1 to the first movable element A2. In the present embodiment, the first transmission mechanism A4 is configured, for example, from a gear train, particularly a speed reducing gear train. The first movable element A2 is configured using a first rotational member A21 which can be moved back and forth in an axial direction in a state in which it meshes with the rod R. In the present embodiment, a threaded rod having a male threaded portion R1 provided on an outer circumferential face thereof is applied as the rod R, and a nut having a female threaded portion provided on an inner circumferential face thereof is applied as the first rotational member A21. More particularly, an end portion, particularly, a base end portion, on the center side in an axial direction of the rod R of the first rotational member A21 functions as a first abutting portion A22 which is abutted with a second abutting portion B22 of a second rotational member B21 of the second system B in a minimum stroke state, and the female threaded portion is formed on the inner circumferential face in a region in the proximity of the first abutting portion A22. Further, in a region of the first rotational member A21 in which the female threaded portion is not formed, a first large diameter portion A23 set to an inner diameter greater than the inner diameter of the female threaded portion is formed. A portion of a first housing A5, that is, a first guide portion A51, which is described subsequently is set such that it can be accommodated in the first large diameter portion A23.

The first housing A5 holds the first rotational member A21 for relative rotation through a first bearing A6 which may be, for example, an angular bearing. The first housing A5 includes the first guide portion A51 of a cylindrical shape accommodated in the first large diameter portion A23 of the first rotational member A21, and a first rod connection portion A52 movable back and forth relative to the first guide portion A51. In the present embodiment, the first rod connection portion A52 is secured to one end portion of the rod R, for example, by a screw. Accordingly, the entire first housing A5 moves back and forth in the axial direction together with the first rotational member A21. In the present embodiment, also the first motor A1 and the first transmission mechanism A4 are accommodated in the first housing A5. Further, the first driving potion A3 is provided at a portion of the first housing A5 aligned with the axial line of the rod R.

Now, operation and action of the electromechanical actuator X having such a configuration as described above are described.

In a state in which both of the first system A and the second system B can operate regularly, that is, in a normal state, if the first motor A1 and the second motor B1 are driven to rotate, then the first rotational member A21 and the second rotational member B21 are rotated in predetermined directions by rotational driving force transmitted thereto through the respective transmission mechanisms, that is, through the first transmission mechanism A4 and the second transmission mechanism B4. Then, in the present embodiment, the first rotational member A21 and the second rotational member B21 are set for rotation on the rod R and for back and forth movement on the rod R through threaded engagement with the rod R in a direction in which they approach each other (the direction is hereinafter referred to as forward direction or advancing direction) or in another direction in which they are spaced away from each other (the direction is hereinafter referred to as reverse direction or retreating direction). The electromechanical actuator X having such a configuration as just described can suitably adjust or change the stroke length St, which is the distance between the first driving potion A3 and the second driving portion B3, between the minimum stroke length St(d) illustrated in FIG. 1 and the maximum stroke length St(d+α) illustrated in FIG. 2 and determined in accordance with specifications. Here, "d" indicates the minimum stroke length itself, and "α" indicates the difference between the maximum stroke length and the minimum stroke length. Further, in the following description, the state of the electromechanical actuator X obtained with the minimum stroke length St(d) is referred to as minimum stroke state (min), and the state of the electromechanical actuator X obtained with the maximum stroke length St(d+α) is referred to as maximum stroke state (max). It is to be noted that, in FIG. 2, for the convenience of illustration, part of the second movable element B2, particularly, the second rotational member B21, when it is at a reference position (S) and the second driving portion B3 in a state in which the second movable element B2, particularly, the second rotational member B21, is disposed at the reference position (S), are individually indicated by an alternate long and two short dashes line.

Figure 2:
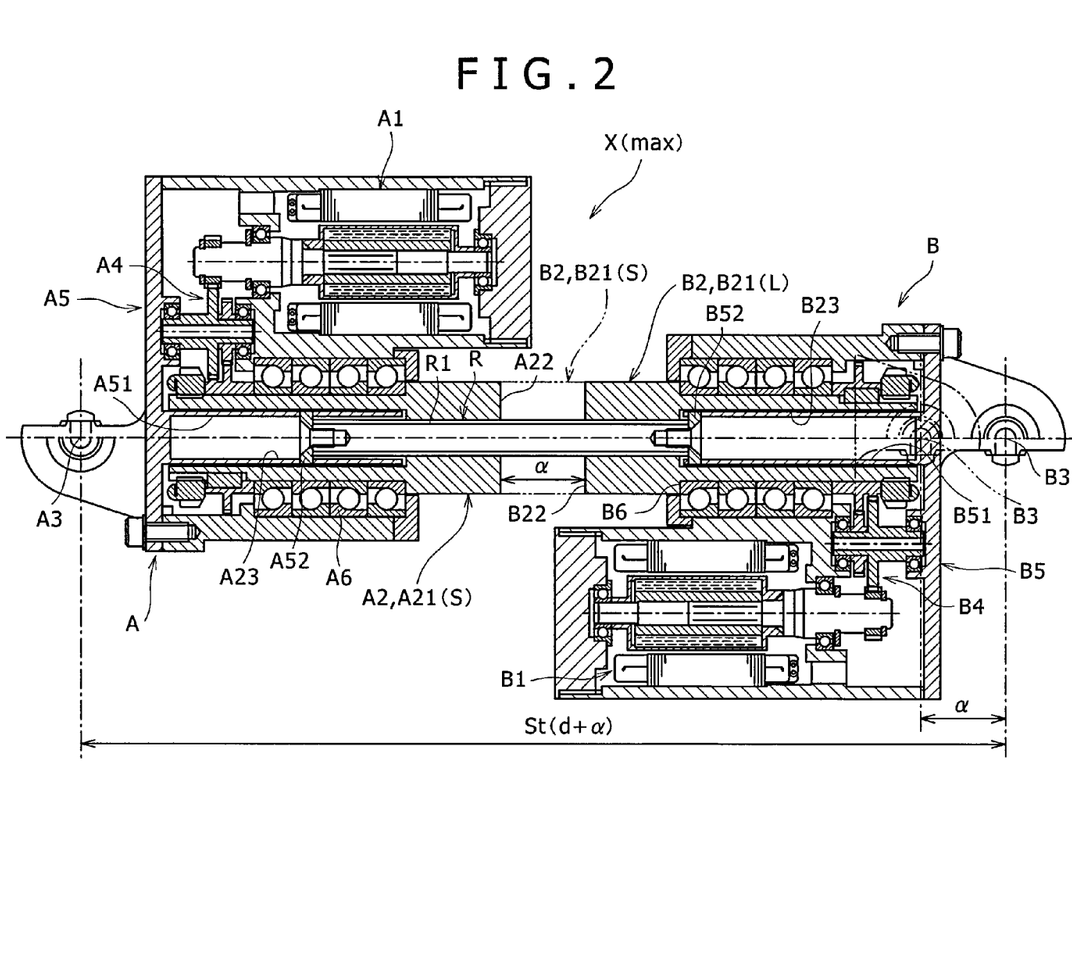
FIG. 2 is a view similar to FIG. 1 but showing the electromechanical actuator in a predetermined maximum stroke state.

When, in a normal state, the electromechanical actuator X is in the minimum stroke state (min), the abutting portions of the first rotational member A21 and the second rotational member B21, that is, the first abutting portion A22 and the second abutting portion B22, abut with each other as seen in FIG. 1. In other words, the stroke length St when the first rotational member A21 and the second rotational member B21 are positioned at the respective reference positions (S) at which they are positioned most near to each other is the minimum stroke length St(d). In order to bring the electromechanical actuator X in the minimum stroke state (min) to the maximum stroke state (max), in the present embodiment, the second motor B1 is driven to rotate in a predetermined direction such that, while the second rotational member B21 is rotated in response to the angle of rotation of the second motor B1, the second rotational member B21 is moved by a predetermined distance in a direction in which the second rotational member B21 is spaced away from the first rotational member A21 which remains at the reference position (S) along the rod R. Here, the position of the second rotational member B21 in the maximum stroke state (max) state illustrated in FIG. 2 is represented as maximum retracted position (L).

Figure 3:
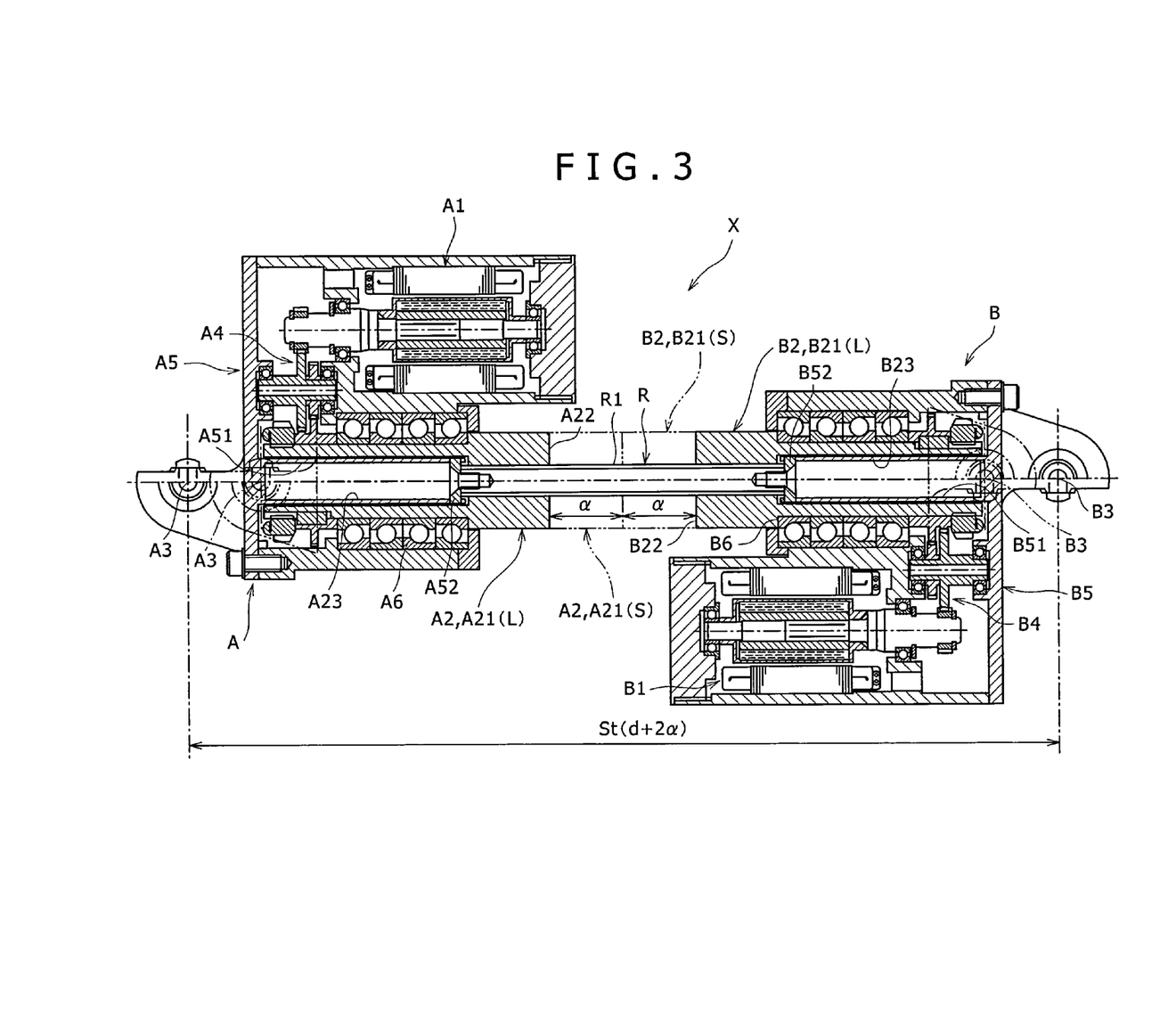
FIG. 3 is a view similar to FIG. 1 but showing the electromechanical actuator in a state in which the space distance between movable elements is set to a maximum distance.

It is to be noted that also it is possible to dispose, as seen in FIG. 3, the second rotational member B21 at the maximum retracted position (L) and drive also the first movable element A2 to rotate in a predetermined direction so that the first rotational member A21 is rotated in response to the angle of rotation of the first motor A1 and moved by a maximum distance in the direction in which it is spaced away from the second rotational member B21 along the rod R to dispose the first rotational member A21 at the maximum retracted position (L). The stroke length St(d+2α) of the electromechanical actuator X in FIG. 3 is longer by the difference a between the maximum stroke length and the minimum stroke length than the required maximum stroke length St(d+α), and such stroke length (d+2α) is not required in actual use. In other words, the maximum stroke length St(d+α) required for the electromechanical actuator X in the present embodiment is set to a distance shorter by the difference α between the maximum stroke length and the minimum stroke length than the stroke length in the state in which the rotational members A21 and B21 are positioned at the respective most retracted positions L. It is to be noted that, in FIG. 3, for the convenience of illustration, part of the first movable element A2 and the second movable element B2, particularly the first rotational member A21 and the second rotational member B21, at the respective reference positions (S) and the first driving potion A3 and the second driving portion B3 in the state in which the first movable element A2 and the second movable element B2, particularly the first rotational member A21 and the second movable element B21, are disposed at the respective reference positions (S), are individually indicated by an alternate long and two short dashes line.

Further, a case is assumed in which, in one of the systems, the motor is placed into a disabled state or jamming occurs with the ball screw mechanism, and the electromechanical actuator X of the present embodiment is configured such that, even in a case in which such a failure as described above occurs, the stroke length St can be adjusted with the full stroke width including the minimum stroke length St(d) and the maximum stroke length St(d+α).

For example, if a failure occurs with the second system B in the maximum stroke state (max) in which the first rotational member A21 of the first movable element A2 is set to the reference position (S) and the second rotational member B21 of the second movable element B2 is set to the maximum retracted position (L) by the electromechanical actuator X to assure the maximum stroke length St(d+α), then it is impossible to move the second rotational member B21 of the second movable element B2 belonging to the second system B to the reference position (S).

Therefore, the electromechanical actuator X according to the present embodiment is configured such that the first motor A1 of the first system A with which no failure occurs can be driven to rotate to forwardly move the first rotational member A21 of the first movable element A2 to the second movable element B2 side, particularly to the second rotational member B21 side, farther than the reference position (S). Here, the difference a between the maximum stroke length St(d+α) and the minimum stroke length St(d) by the electromechanical actuator X according to the present embodiment corresponds to the spaced distance from the position at which the abutting portions A22 and B22 of the movable elements A2 and B2, particularly the rotational members A21 and B21, shown in FIG. 1 abut with each other to the position of the second abutting portion B22 shown in FIG. 2, that is, between the abutting portions A22 and B22. Further, in the present embodiment, the movable elements A2 and B2, particularly the rotational members A21 and B21, are configured such that they themselves can move by at least the difference a between the predetermined maximum stroke length and the minimum stroke length in both of the forward and backward directions along the rod R on the opposite sides of the reference position (S).

Figure 4:
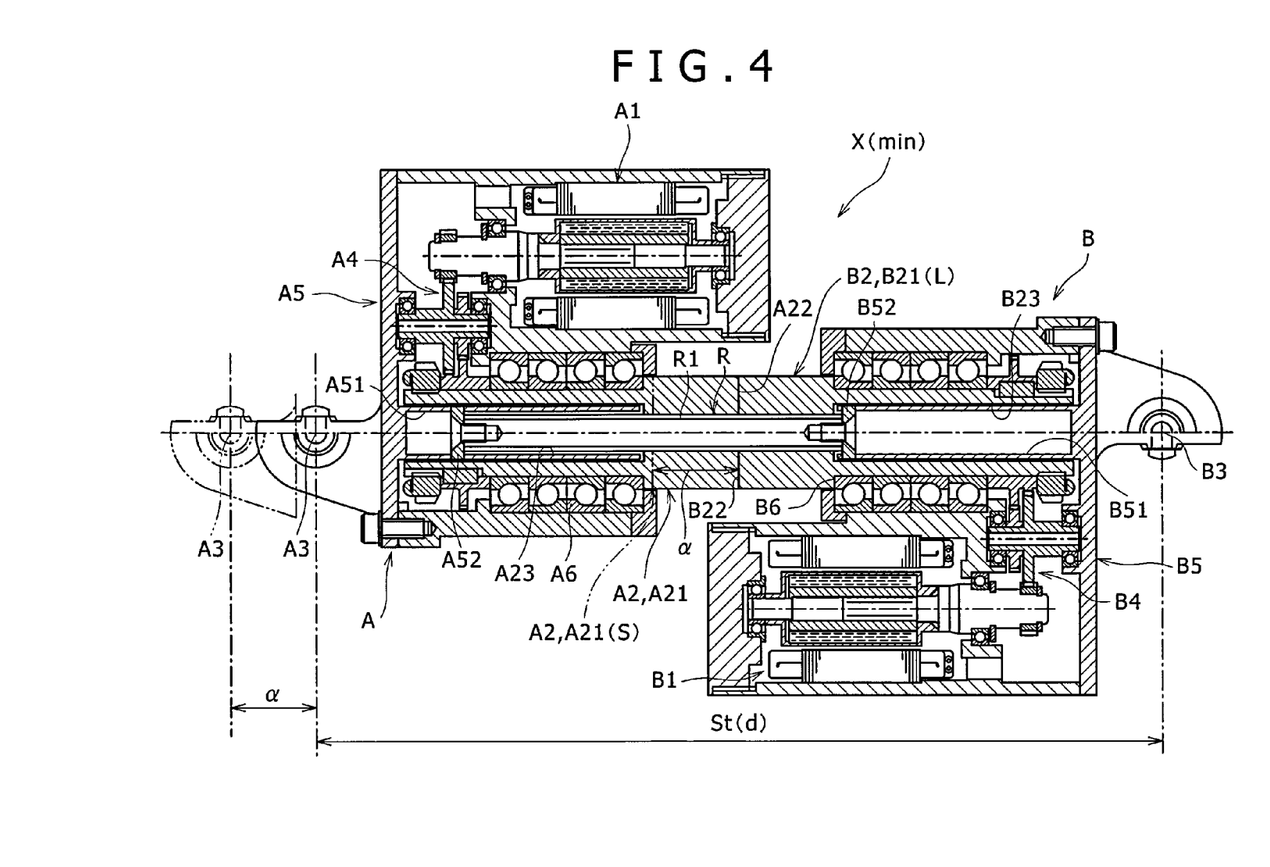
FIG. 4 is a view similar to FIG. 1 but showing the electromechanical actuator in another state in which the minimum stroke length is assured when a failure occurs.

Accordingly, if, in the maximum stroke state (max) in which the maximum stroke length St(d+α) shown in FIG. 2 is assured, a failure occurs with the second system B and consequently the second movable element B2, particularly the second rotational member B21, is placed into an immovable state, then the stroke length St of the electromechanical actuator X can be made shorter than the maximum stroke length St(d+α) by moving the first rotational member A21 of the first movable element A2 of the first system A toward the second rotational member B21 side of the second movable element B2 along the rod R farther than the reference position (S). Then, as seen in FIG. 4, by forwardly moving the first rotational member A21 of the first movable element A2 to the position at which the first abutting portion A22 abuts with the second abutting portion B22, any further movement of the first rotational member A21 of the first movable element A2 in the same direction is restricted. In this instance, the minimum stroke length St(d) which is the spaced distance between the first driving portion A3 and the second driving portion B3 is equal to the stroke when both of the first movable element A2 and the second movable element B2, particularly both of the first rotational member A21 and the second rotational member B21, are set to the respective reference positions (S), that is, to the maximum stroke length St(d+α). It is to be noted that, in FIG. 4, for the convenience of illustration, part of the first rotational member A21 of the first movable element A2 and the first driving potion A3 in the state in which the first rotational member A21 of the first movable element A2 is positioned at the reference position (S) are individually indicated by an alternate long and two short dashes line.

In this manner, the electromechanical actuator X in the present embodiment can assure the minimum stroke length St(d) even when a failure occurs with one of the systems in the maximum stroke state (max). Further, this electromechanical actuator X is placed into the maximum stroke state (max) which exhibits the maximum stroke length St(d+α) by moving the first rotational member A21 of the first movable element A2 of the first system A from the minimum stroke state (min) which exhibits the minimum stroke length St(d) illustrated in FIG. 4 to the reference position (S).

On the other hand, if a failure occurs with the second system B in the minimum stroke state (min) illustrated in FIG. 1 wherein the first movable element A2 and the second movable element B2, particularly the first rotational member A21 and the second rotational member B21, are set to the respective reference positions (S) by the electromechanical actuator X, then it is impossible to move the second rotational member B21 of the second movable element B2 belonging to the second system B to any other position than the reference position (S).

Also in such a case, the electromechanical actuator X according to the present embodiment can drive the first motor A1 belonging to the first system A which suffers from no failure to rotate to move the first rotational member A21 of the movable element A2 rearwardly in a direction in which it is spaced away from the second rotational member B21 of the second movable element B2 farther than the reference position (S) to make the stroke length St of the electromechanical actuator X longer than the minimum stroke length St(d). Then, though not shown, by backwardly moving the first rotational member A21 of the first movable element A2 along the rod R by the difference α between the maximum stroke length and the minimum stroke length of the electromechanical actuator X from the reference position (S), the stroke length St which is the spaced distance between the first driving potion A3 and the second driving portion 133 becomes the maximum stroke length St(d+α). Accordingly, even when a failure occurs with one of the systems in the minimum stroke state (min), the electromechanical actuator X of the present embodiment can assure the maximum stroke length St(d+α). Further, the electromechanical actuator X is placed into the minimum stroke state (min) by moving the first rotational member A21 of the first movable element A2 of the first system A from the state in which the maximum stroke length is exhibited to the reference position (S).

It is to be noted that, though not shown, if a failure occurs with the second system B in a state in which the second movable element B2 is positioned between the reference position (S) and the maximum retracted position (L), the stroke length St of the electromechanical actuator X can be adjusted by forwardly moving the first movable element A2 of the first system A to the second movable element B2 side farther than the reference position (S) or by backwardly moving the first movable element A2 of the first system A in a direction in which the first movable element A2 is spaced away from the second movable element B2 farther than the reference position (S). Then, if the first movable element A2 is forwardly moved to the position at which the first abutting portion A22 abuts with the second abutting portion B22, then the minimum stroke length St(d) can be obtained. On the other hand, if the first movable element A2 is moved in the direction in which it is spaced away from the second movable element B2 farther than the reference position (S) by a distance corresponding to a value obtained by subtracting a distance represented by "t" from the reference position (S) of the second movable element B2 to the position at which second movable element B2 stops in an immovable state from the difference α between the maximum stroke length and the minimum stroke length, that is, corresponding to "α−t," then the maximum stroke length St(d+α) can be obtained.

In this manner, the electromechanical actuator X according to the present embodiment can set the stroke length St thereof to the minimum stroke length St(d) by setting the first movable element A2 and the second movable element B2 for back and forth movement in directions in which they move toward and away from each other on the common rod R and arranging the first movable element A2 and the second movable element B2 to the reference position (S) in a state in which both of the first system A and the second system B are operating normally. Further, by setting the first movable element A2 to the reference position (S) and setting the second movable element B2 to the maximum retracted position (L), the stroke length St of the electromechanical actuator X can be set to the maximum stroke length St(d+α). Then, when a failure that one of the two systems, in the example described hereinabove, the second system B does not operate normally, even if the movable element of the systems, that is, the second movable element B2, is immovable in a state in which it is positioned at the maximum retracted position (L), the stroke length St of the electromechanical actuator X can be made the minimum stroke length St(d) by moving the movable element of the system which is operating normally, that is, by moving the first movable element A2 of the first system A, in a direction in which the movable element of the normally operating system approaches the other movable element, that is, in the advancing direction in which the first movable element A2 of the first system A moves forwardly, farther than the reference position (S). Further, upon occurrence of a failure wherein one of the systems, for example, the second movable element B2, does not operate normally, even if the movable element of the system such as the second movable element B2 is in an immovable state while it is positioned at the reference position (S), by moving the movable element of the system operating normally such as the first movable element A2 of the first system A in the direction such as the backward direction in which the movable element of the normally operating system such as the first movable element A2 of the first system A is spaced away from the other movable element such as the second movable element B2 farther than the reference position (S), the stroke length St of the electromechanical actuator X can be made the maximum stroke length St(d+α).

Further, upon occurrence of a failure wherein one of the systems such as the second system B does not operate normally, even if the movable element of the system such as the second movable element B2 is disabled from movement in a state in which it is positioned between the reference position (S) and the maximum retracted position (L), the stroke length St of the electromechanical actuator X can be made the minimum stroke length St(d) by moving the movable element of the other normally operating system such as the first movable element A2 of the first system A in a direction such as the forward direction in which the movable element of the normally operating system approaches the other movable element such as the second movable element B2 farther than the reference position (S). Or, the stroke length St of the electromechanical actuator X can be made the maximum stroke length St(d+α) by moving the movable element of the normally operating system such as the first movable element A2 of the first system A in a direction such as the backward direction in which the movable element of the normally operating system is spaced away from the other movable element such as the second movable element B2 farther than the reference position (S).

It is to be noted that the foregoing description is given keeping in mind the electromechanical actuator X which exhibits the maximum stroke length in the case where, in a normal state, the first movable element A2 is set to the reference position (S) and the second movable element B2 is set to the maximum retracted position (L), that is, the electromechanical actuator X wherein, in a normal state, the first movable element A2 is normally positioned at the reference position (S). However, for example, even with the electromechanical actuator X which exhibits the maximum stroke length in the case where the first movable element A2 is set to the maximum retracted position (L) and the second movable element B2 is set to the reference position (S), in other words, the electromechanical actuator X wherein, in a normal state, the second movable element B2 is always positioned at the reference position (S), or even with the electromechanical actuator X which exhibits the maximum stroke length in the case where both of the first movable element A2 and the second movable element B2 are set to positions between the reference position (S) and the maximum retracted position (L), if a failure occurs with one of the systems, then the minimum stroke length St(d) and the maximum stroke length St(d+α) can be assured by moving the movable element of the other system forwardly or backwardly along the rod R.

In this manner, if a failure occurs with one of the systems, then the electromechanical actuator X according to the present embodiment can eliminate the conventional failure that the full stroke width including the minimum stroke length St(d) and the maximum stroke length St(d+α) cannot be assured. Consequently, the electromechanical actuator is superior in reliability and practical use.

Further, in the electromechanical actuator X according to the present embodiment, the movable elements such as the first movable element A2 and the second movable element B2 are configured using rotational members such as the first rotational member A21 and the second movable element B21 which are acted upon by rotational driving force of corresponding motors such as the first motor A1 and the second motor B1 to move back and forth with respect to the rod R through threaded engagement with the rod R. Therefore, while the electromechanical actuator X has a comparatively simple structure, rotational movement transmitted from the motors A1 and B1 can be converted in a high efficiency into movement in an axial direction, and fine adjustment of the stroke length St can be carried out.

Further, in the electromechanical actuator X according to the present embodiment, abutting portions which abut, in the minimum stroke state (min), with each other to restrict further movement thereof in a direction in which they approach each other such as the first abutting portion A22 and the second abutting portion B22 are formed on the first movable element A2 and the second movable element B2. Therefore, an accurate minimum stroke length can be assured not only in a normal state but also upon occurrence of a failure without giving rise to significant increase of the number of parts and extreme complication in structure.

It is to be noted that the present invention is not limited to the embodiment described above. For example, a member which can slidably move in an axial direction of a rod can be applied as the movable elements of the systems.

Further, as the rods, a member formed by connecting a plurality of rod elements to each other in an axial direction may be applied. In this instance, it is necessary to satisfy a condition that any connection portion does not disturb movement of the movable element.

While, in the embodiment described above, the mode in which driving sections such as the first driving section and the second driving section are provided in the proximity of end portions of movable elements through housings for holding rotational members as movable elements for rotation thereon is described, another mode in which the driving sections are disposed directly at the end portions of the movable elements.

Also it is possible to configure the movable elements such that they do not abut directly with each other at the reference positions at which the movable elements are positioned nearest to each other. In this instance, stoppers for preventing, in a normal state, the movable elements disposed at the reference positions from moving any more in directions in which they approach each other may be provided. Preferably, however, the stoppers are configured for back and forth movements together with or integrally with the movable elements along the rod.

Further, the electromechanical actuator according to the present invention can be used, for example, for driving of a steering wing or an opening/closing hatch or driving of a like member.

Further, also a particular configuration of the components is not limited to that in the embodiment described above, and the embodiment can be modified in various forms without departing from the spirit and scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. An electromechanical actuator, comprising:
a first system including a first motor and a first movable element capable of being moved back and forth in an axial direction of a rod by rotational driving force of said first motor, said rod being a threaded rod having a male threaded portion provided on an outer circumferential face thereof, and said first movable element including a first nut having a first female threaded portion provided on an inner circumferential face thereof, the first nut receiving rotational driving force of said first motor to move back and forth on said rod through threaded engagement between said male threaded portion of said rod and said first female threaded portion of said first nut; and
a second system including a second motor and a second movable element capable of being moved back and forth in the axial direction of said rod by rotational driving force of said second motor, said second movable element including a second nut having a second female threaded portion provided on an inner circumferential face thereof, the second nut receiving rotational driving force of said second motor to move back and forth on said rod through threaded engagement between said male threaded portion of said rod and said second female threaded portion of said second nut;
said electromechanical actuator being capable of adjusting a stroke length which is a distance between a first driving section set to or in the end portion or the proximity of an end portion of said first movable element and a second driving section set to or in the end portion or the proximity of an end portion of said second movable element;
said first movable element and said second movable element being configured for back and forth movement in the axial direction of the rod such that the stroke length in a state in which said first movable element and said second movable element are positioned at respective reference positions at which said first movable element and said second movable element are positioned nearest to each other is set as a minimum stroke length;
said first movable element and said second movable element being capable of individually moving by at least a difference between a predetermined maximum stroke length and the minimum stroke length in both of directions in which said first movable element and said second movable element move toward and away from each other with respect to the reference positions, the predetermined maximum stroke length being the stroke length between a stroke length when said first movable element and said second movable element are farthest to each other and a stroke length when said first movable element and said second movable element are at the reference positions, and
if a failure occurs in said first movable element, the minimum stroke length is achieved by moving said second movable element closer to the first movable element than a position of the second movable element when the first movable element is not in a failure state and the stroke length is the minimum stroke length, and the predetermined maximum stroke length is achieved by moving said second movable element farther from the first movable element than a position of the second movable element when the first movable element is not in a failure state and the stroke length is the predetermined maximum stroke length.

2. The electromechanical actuator according to claim 1, wherein said first movable element and said second movable element include abutting portions which abut with each other in a state in which the minimum stroke length is exhibited.

3. The electromechanical actuator according to claim 1, wherein said first movable element and said second movable element include abutting portions which abut with each other in a state in which the minimum stroke length is exhibited.

4. The electromechanical actuator according to claim 1, wherein if a failure occurs in said second movable element, the minimum stroke length is achieved by moving said first movable element closer to the second movable element than a position of the first movable element when the second movable element is not in a failure state and the stroke length is the minimum stroke length, and the predetermined maximum stroke length is achieved by moving said first movable element farther from the second movable element than a position of the first movable element when the second movable element is not in a failure state and the stroke length is the predetermined maximum stroke length.

* * * * *